Figure 5:
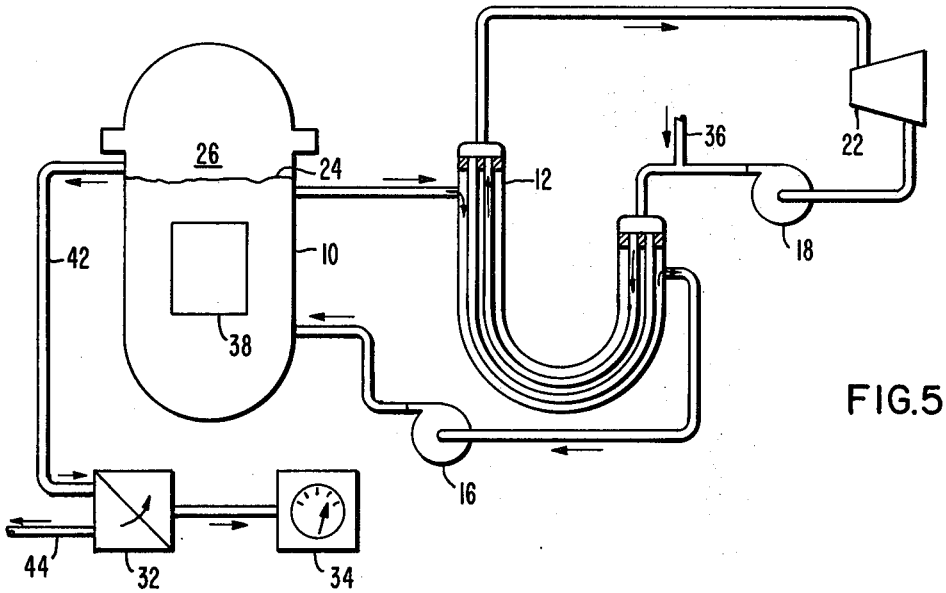
Figure 6:
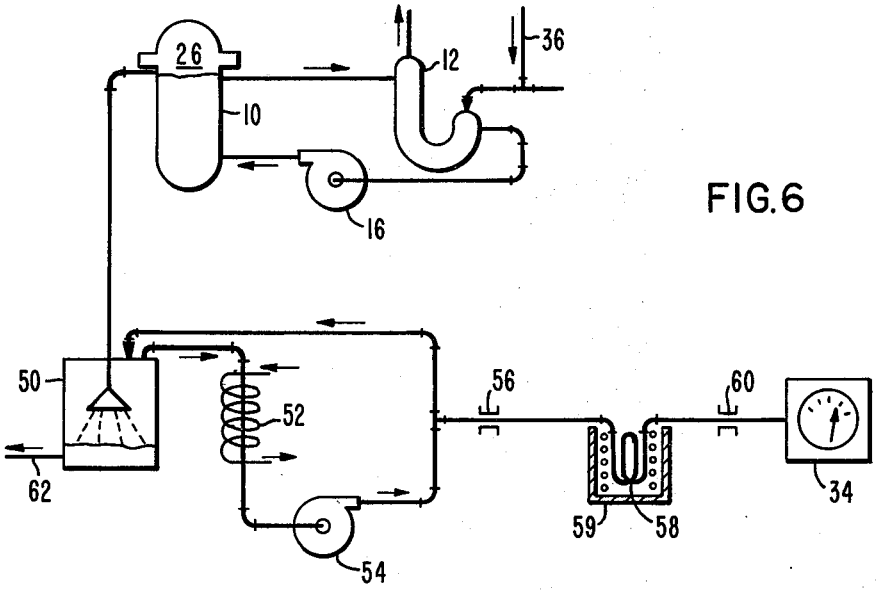

United States Defensive Publication [19] (H) [11] T955,004

Sayre [43] Feb. 1, 1977

[54] METHOD FOR HEAT EXCHANGER LEAK DETECTION IN A LIQUID METAL COOLED NUCLEAR REACTOR

[75] Inventor: Robert K. Sayre, Mount Lebanon, Pa.

[73] Assignee: Westinghouse Electric Corporation, Pittsburgh, Pa.

[21] Appl. No.: 673,563

[22] Filed: Apr. 5, 1976

[51] Int. Cl.[2] ..... G21C 17/00

[52] U.S. Cl. ..... 176/19 R; 176/38; 176/92 R

[57] ABSTRACT

An on-line method for early detection of a leak through a tube of a liquid metal-to-water tube type heat exchanger in a liquid metal cooled nuclear reactor system. Introducing helium to the heat exchanger feedwater exposes the helium to any heat exchanger leak locations, and the helium will diffuse or flow through the leak location into the liquid metal. An increase in the helium content of the liquid metal evidences the existence of a leak. The content of helium in the liquid metal can be detected either by direct analysis of the reactor cover gas in a dual cycle reactor plant, or by removing a coolant sample from the reactor system downstream of the heat exchanger in a dual or triple cycle plant, separating the gaseous content of the sample, and analyzing the gaseous content for helium. The properties of helium are such that the invention method may result in identification of a tube leak before any water and liquid metal actually come in contact.

11 Claims, 2 Sheets Drawing,

20 Pages Specification

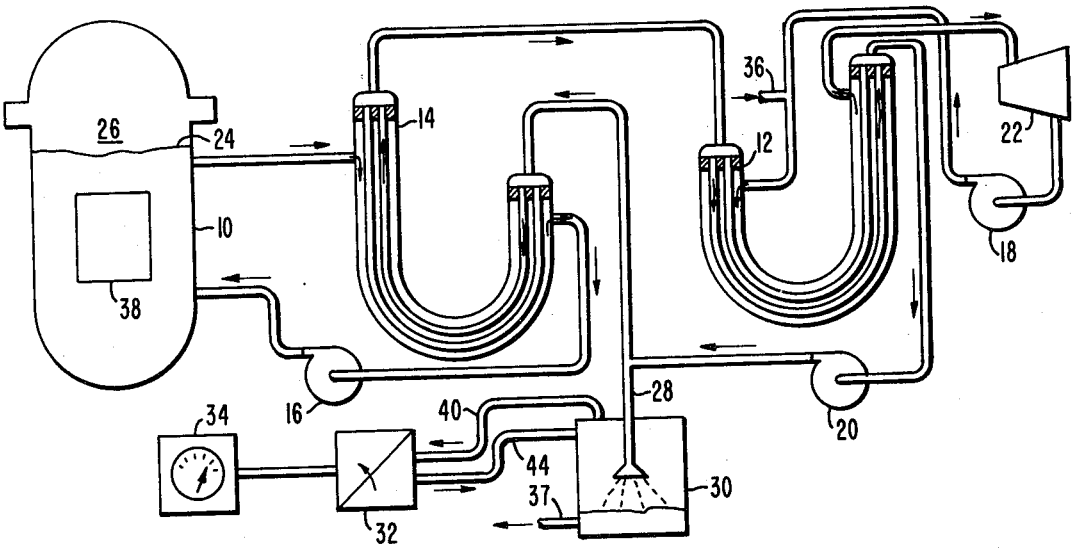

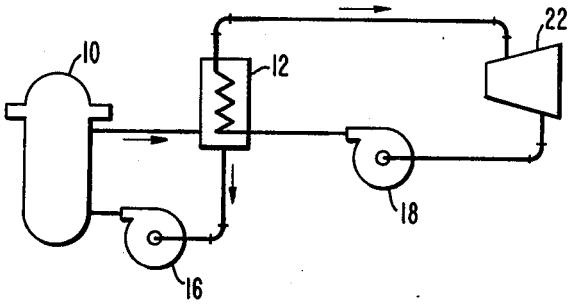
FIG.1
FIG.2
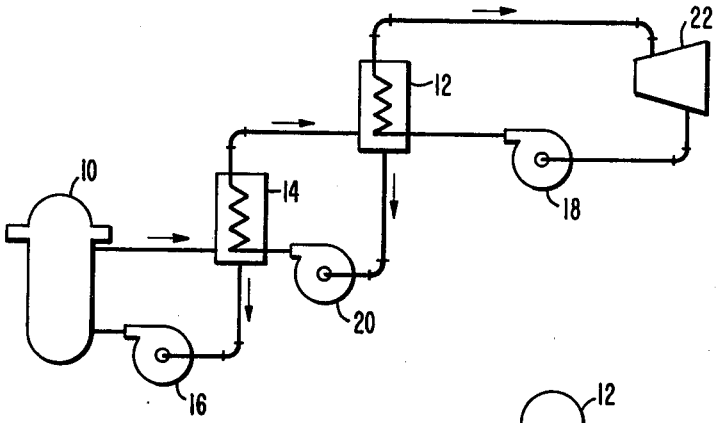
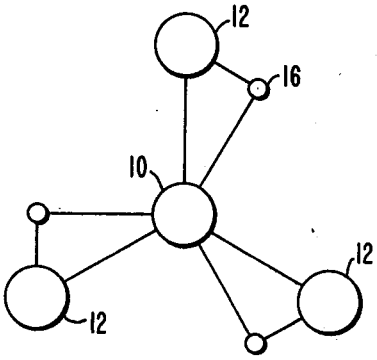
FIG.3
FIG.4
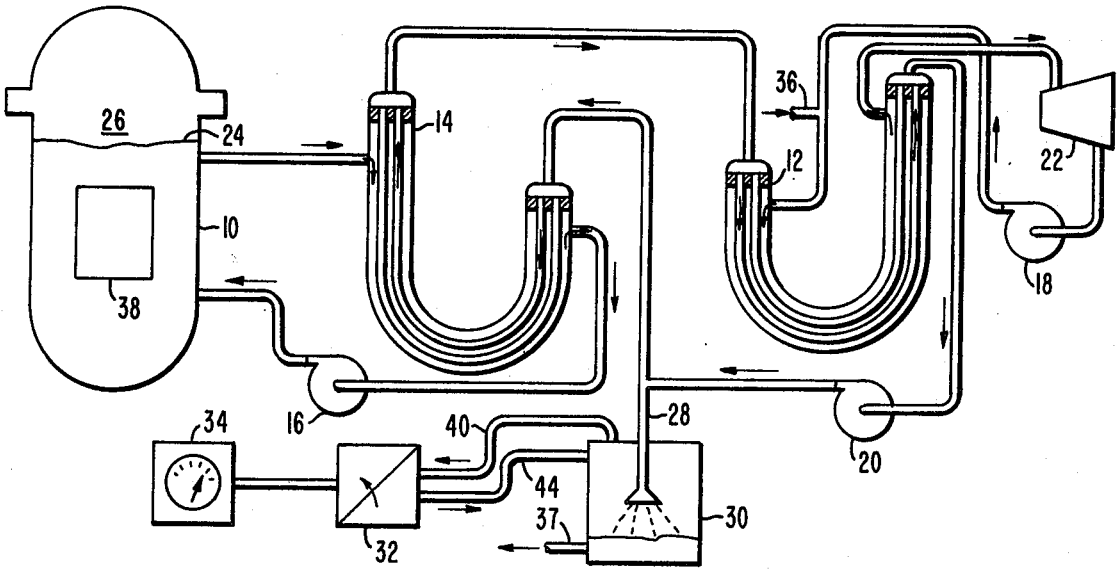

The file of this unexamined application may be inspected and copies thereof may be purchased (849 O.G. 1221, Apr. 9, 1968).